(12) United States Patent
Suzuki et al.

(10) Patent No.: US 10,625,767 B2
(45) Date of Patent: Apr. 21, 2020

(54) STEERING DEVICE

(71) Applicants: JTEKT CORPORATION, Osaka-shi, Osaka (JP); HIRUTA-KOGYO CO., LTD., Kasaoka-shi, Okayama (JP)

(72) Inventors: Takuya Suzuki, Kashihara (JP); Daiki Goto, Shiki-gun (JP); Susumu Imagaki, Tondabayashi (JP); Takahiro Fujii, Fukuyama (JP)

(73) Assignees: JTEKT CORPORATION, Osaka-shi (JP); HIRUTA-KOGYO CO., LTD., Kasaoka-shi (JP)

( * ) Notice: Subject to any disclaimer, the term of this patent is extended or adjusted under 35 U.S.C. 154(b) by 89 days.

(21) Appl. No.: 15/964,834

(22) Filed: Apr. 27, 2018

(65) Prior Publication Data
US 2018/0327017 A1    Nov. 15, 2018

(30) Foreign Application Priority Data

May 10, 2017 (JP) ................................. 2017-093953

(51) Int. Cl.
*B62D 1/184* (2006.01)
*B62D 1/187* (2006.01)

(52) U.S. Cl.
CPC .............. *B62D 1/187* (2013.01); *B62D 1/184* (2013.01)

(58) Field of Classification Search
CPC ......... B62D 1/184; B62D 1/185; B62D 1/187
See application file for complete search history.

(56) References Cited

U.S. PATENT DOCUMENTS

| 8,505,407 | B2 * | 8/2013 | Nomura | B62D 1/184 280/775 |
|---|---|---|---|---|
| 9,145,161 | B2 * | 9/2015 | Nagasawa | B22D 19/045 |
| 9,828,018 | B2 * | 11/2017 | Mihara | B62D 1/185 |
| 2011/0204610 | A1 * | 8/2011 | Kwon | B62D 1/184 280/775 |
| 2013/0174685 | A1 * | 7/2013 | Yamamoto | B62D 1/184 74/493 |
| 2014/0196564 | A1 * | 7/2014 | Bang | B62D 1/187 74/493 |
| 2014/0290424 | A1 * | 10/2014 | Kwon | B62D 1/184 74/493 |
| 2015/0107398 | A1 * | 4/2015 | Nagasawa | B22D 17/00 74/493 |
| 2015/0122075 | A1 * | 5/2015 | Mihara | B62D 1/185 74/493 |
| 2017/0057537 | A1 * | 3/2017 | Handy | B62D 1/185 |

FOREIGN PATENT DOCUMENTS

JP         5076963 B2    11/2012

* cited by examiner

*Primary Examiner* — Ruth Ilan
(74) *Attorney, Agent, or Firm* — Oliff PLC

(57) ABSTRACT

A steering device includes: an inner tube; an outer tube that fixes the inner tube by fastening the inner tube from an outer side, and has a first slit extending in an axial direction; a pair of clamp brackets that is disposed so that the clamp brackets face each other with the first slit therebetween; and a reinforcing member that is connected to one of the clamp brackets and also connected to a connection region that is a region of an outer circumferential surface of the outer tube and located farther on one side in the axial direction than an end of the first slit on the one side in the axial direction.

6 Claims, 4 Drawing Sheets

STEERING DEVICE

INCORPORATION BY REFERENCE

The disclosure of Japanese Patent Application No. 2017-093953 filed on May 10, 2017 including the specification, drawings and abstract is incorporated herein by reference in its entirety.

BACKGROUND

1. Technical Field

The present disclosure relates to a steering device, and more particularly to a steering device including an outer tube and an inner tube.

2. Description of Related Art

A steering device is installed in a vehicle, such as an automobile. A steering device rotates a steering shaft according to an operation of a driver of the vehicle rotating a steering wheel, and transmits the rotation of the steering shaft to a rack.

The steering device has an outer tube and an inner tube. At least one of the outer tube and the inner tube supports the steering shaft so as to be rotatable around a rotational axis.

In the steering device, part of the inner tube is fitted inside the outer tube. During normal driving of the vehicle, the inner tube is fixed to the outer tube. Specifically, the outer tube has a slit formed therein that extends in an axial direction. When the outer tube is fastened from the radially outer side, the outer tube elastically deforms so as to reduce the inside diameter due to the slit formed in the outer tube. As a result, the inner tube is fastened by the outer tube, so that the inner tube is fixed to the outer tube.

Some steering devices have a key lock hole which is formed in an outer column and into which a lock key of a steering lock device that locks the steering shaft is inserted.

When the steering wheel is operated while the steering shaft is locked, a torsional force is exerted on the outer tube. This torsional force causes a rotational torque on a part of the outer tube between the key lock hole and the slit. As a stress due to the rotational torque concentrates at a peripheral edge of the slit in the outer tube, the outer tube may break. Thus, it is necessary to provide the outer tube with measures against breakage.

Japanese Patent No. 5076963 discloses a steering device in which a slit is formed in an outer tube such that the extension direction of the slit is inclined relative to a central axis of the outer tube. Thus, the distance between the slit and a key lock hole can be increased, which can enhance the mechanical strength of the outer tube.

However, the steering device according to Japanese Patent No. 5076963 cannot reduce stress on the peripheral edge of the slit in the outer tube. Moreover, depending on the type of vehicle to be equipped with this steering device, a sufficient distance between the slit and the key lock hole cannot be secured, which can make it difficult to enhance the mechanical strength of the outer tube.

SUMMARY

The present disclosure provides a steering device that can reduce stress on a peripheral edge of a slit in an outer tube.

A steering device according to the present disclosure includes: an inner tube extending in an axial direction; an outer tube that fixes the inner tube by fastening an end of the inner tube on one side in the axial direction from the outer side, and that has a first slit extending through the outer tube between an inner circumferential surface and an outer circumferential surface thereof and extending in the axial direction; a pair of clamp brackets that is disposed so that the clamp brackets face each other with the first slit therebetween, and extends from the outer circumferential surface of the outer tube in a direction intersecting the axial direction; and a reinforcing member that is connected to one of the clamp brackets and also connected to a connection region that is a region of the outer circumferential surface of the outer tube and located farther on the one side in the axial direction than an end of the first slit on the one side in the axial direction.

The steering device according to the present disclosure can reduce stress on a peripheral edge of a slit in an outer tube.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A steering device according to an embodiment of the present disclosure includes an inner tube, an outer tube, a pair of clamp brackets, and a reinforcing member. The inner tube extends in an axial direction. The outer tube fixes the inner tube by fastening an end of the inner tube on one side in the axial direction from an outer side. A first slit is extending through the outer tube between an inner circumferential surface and an outer circumferential surface thereof and extends in the axial direction. The clamp brackets are disposed so that the clamp brackets face each other with the first slit therebetween, and extend from the outer circumferential surface of the outer tube in a direction intersecting the axial direction. The reinforcing member is connected to one of the clamp brackets and also connected to a connection region that is a region of the outer circumferential surface of the outer tube and located farther on the one side in the axial direction than an end of the slit on the one side in the axial direction (first configuration).

According to the first configuration, when a torsional force is applied to a part of the outer tube farther on the one side in the axial direction than the connection region, the torsional force is transmitted as a rotational torque from the connection region of the outer circumferential surface of the outer tube to the reinforcing member. A stress due to the rotational torque is transmitted from the reinforcing member to one of the clamp brackets. Since the slit is formed in the outer tube farther on the other side in the axial direction than the connection region, the stress applied to a peripheral edge of the slit is reduced.

In the first configuration, the steering device further includes a tilt bracket and an upper bracket. The tilt bracket holds the clamp brackets in a direction in which the clamp brackets face each other. The upper bracket is fixed to the tilt bracket and also fixed to a frame of a vehicle equipped with the steering device (second configuration).

According to the second configuration, a stress transmitted to the reinforcing member is transmitted to the frame of the vehicle through one of the clamp brackets, the tilt bracket, and the upper bracket. Thus, it is possible to reduce the likelihood that a stress transmitted to the reinforcing member returns to the outer tube.

In the first or second configuration, the steering device further includes a second slit. The second slit is formed so as to extend in a direction intersecting an extension direction of the first slit. The second slit is extending through the outer tube between the inner circumferential surface and the outer circumferential surface thereof, and is connected to an end of the first slit on the one side in the axial direction (third configuration).

According to the third configuration, the second slit is formed in the outer tube, and thereby the length of the first slit in the axial direction can be reduced. Accordingly, the length in the axial direction of a steering column formed by the inner tube and the outer tube can be reduced.

In the third configuration, the reinforcing member includes a tube connection part. The tube connection part is connected to the connection region of the outer tube. The length of the tube connection part in an extension direction of the second slit is smaller than the length of the second slit in the extension direction of the second slit (fourth configuration).

According to the fourth configuration, the outer tube deforms easily so as to reduce the inside diameter when the outer tube fixes the inner tube by fastening it from the outer side. Thus, during normal driving of the vehicle, the inner tube can be prevented from moving relative to the outer tube.

In one of the first to fourth configurations, the steering device further includes a key lock hole. The key lock hole is formed in the outer tube farther on the one side in the axial direction than the connection region, and is extending through the outer tube between the inner circumferential surface and the outer circumferential surface thereof. A lock key of a steering lock device of a vehicle equipped with the steering device can be inserted into the key lock hole (fifth configuration).

According to the fifth configuration, rotation of the steering wheel of the vehicle is restricted by the lock key. In this case, even when the steering wheel is forcibly rotated and a torsional force is thereby applied to the outer tube, a stress applied to the peripheral edge of the first slit in the outer tube can be reduced.

Figure 1:
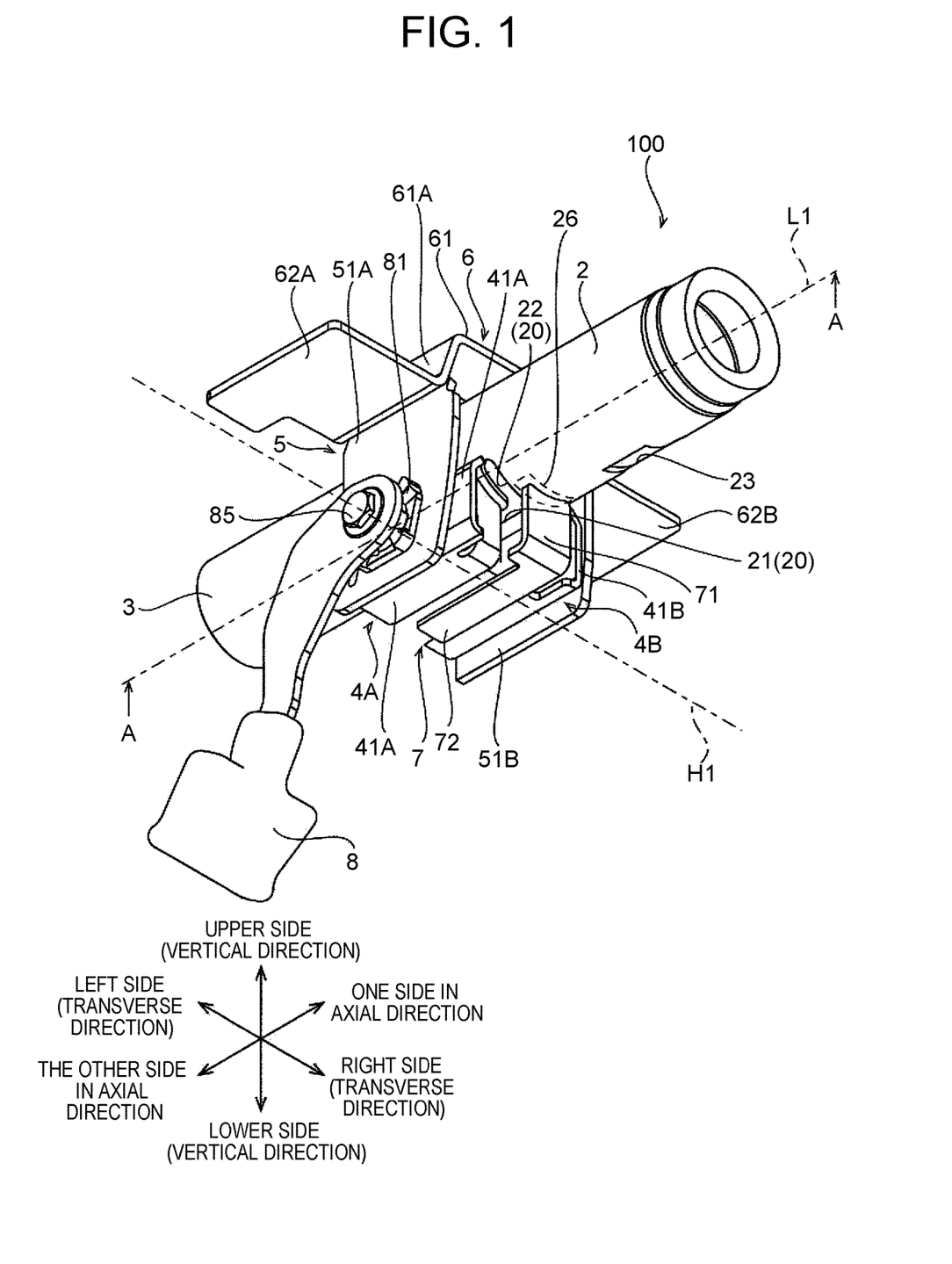
FIG. 1 is a perspective view of a steering device according to an embodiment of the present disclosure.
Figure 2:
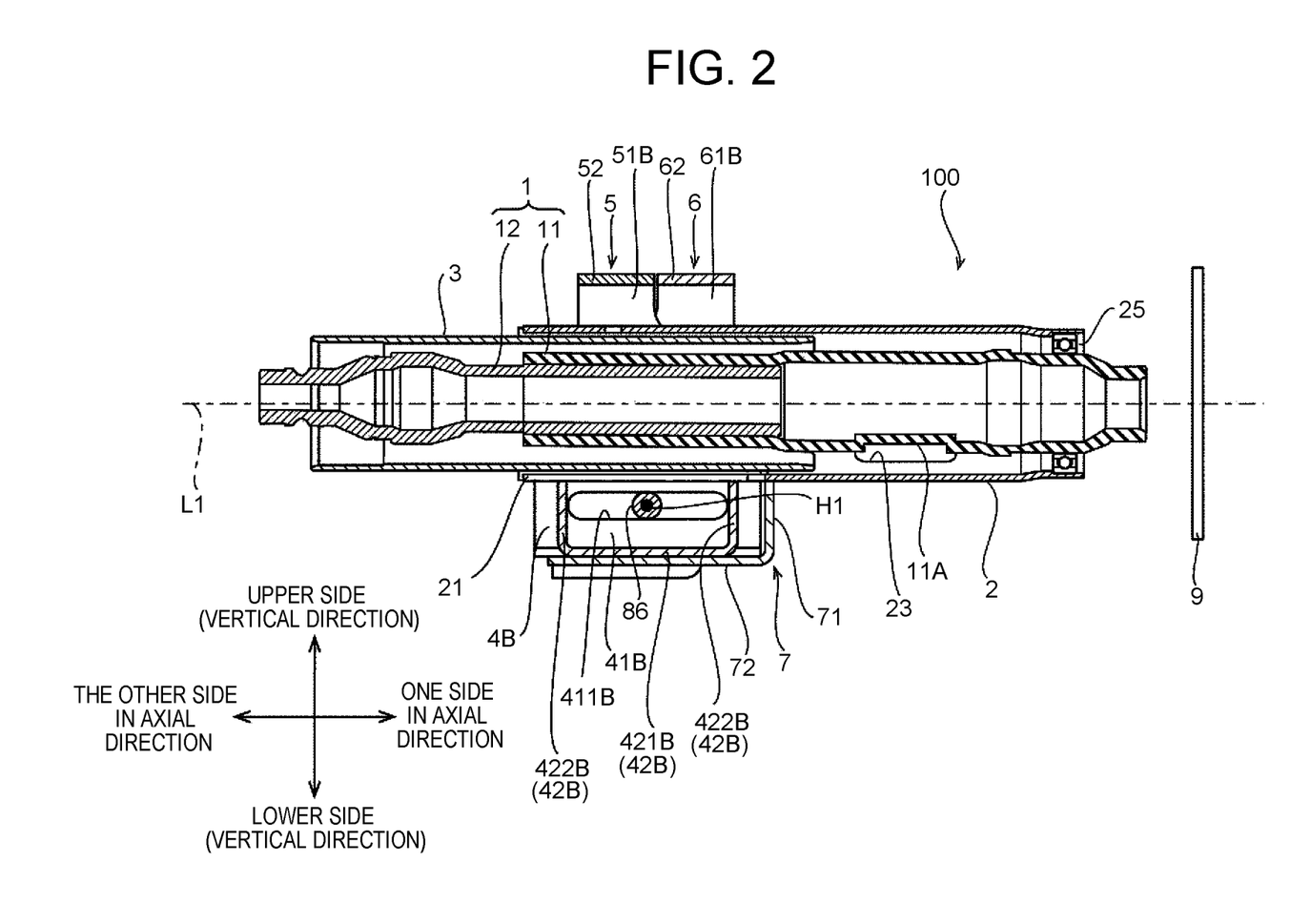
FIG. 2 is a sectional view of the steering device shown in FIG. 1.

In the following, the embodiment of the present disclosure will be described in detail with reference to the drawings. The same or equivalent parts in the drawings will be denoted by the same reference signs and description thereof will not be repeated. For the convenience of illustration, configurations in the drawings may be shown in a simplified or schematic manner, or some components may be shown in a simplified manner. FIG. 1 is a perspective view of a steering device 100 according to the embodiment of the present disclosure. FIG. 2 is a sectional view of the steering device 100 shown in FIG. 1 taken along line A-A. In FIG. 1, s steering shaft 1 and a steering wheel 9 shown in FIG. 2 are not shown.

Referring to FIG. 1, the steering device 100 includes an outer tube 2, an inner tube 3, a pair of clamp brackets 4A, 4B, a tilt bracket 5, an upper bracket 6, a reinforcing member 7, and a lever 8. The tilt bracket 5 has arms 51A, 51B.

For the following description, an extension direction of a central axis L1 shown in FIG. 1 is defined as an axial direction. A side in the axial direction where the outer tube 2 is disposed is defined as one side in the axial direction. A side in the axial direction where the inner tube 3 is disposed is defined as the other side in the axial direction.

Referring to FIG. 1, a direction which is perpendicular to the axial direction and in which the arms 51A, 51B of the tilt bracket 5 face each other is defined as a transverse direction. A side in the transverse direction where the arm 51A is disposed is defined as a left side. A side in the transverse direction where the arm 51B is disposed is defined as a right side.

Referring to FIG. 1, a direction perpendicular to both the axial direction and the transverse direction is defined as a vertical direction. Thus, the vertical direction is a direction in which the arms 51A, 51B of the tilt bracket 5 extend and which intersects the axial direction. A side in the vertical direction where the upper bracket 6 is disposed is defined as an upper side. A side in the vertical direction where the lever 8 is disposed is defined as a lower side.

Steering Shaft 1

Referring to FIG. 2, the steering device 100 further includes the steering shaft 1 and the steering wheel 9. The steering shaft 1 is disposed so as to be centered on the central axis L1, and rotates around the central axis L1 as the rotational axis.

The steering shaft 1 has an outer shaft 11 and an inner shaft 12. The outer shaft 11 is disposed farther on the one side in the axial direction than the inner shaft 12, and the inner shaft 12 is disposed farther on the other side in the axial direction than the outer shaft 11.

An end of the inner shaft 12 on the other side in the axial direction is connected to an intermediate shaft (not shown). An end of the inner shaft 12 on the one side in the axial direction is connected by serration coupling to an end of the outer shaft 11 on the other side in the axial direction. An end of the outer shaft 11 on the one side in the axial direction is connected to the steering wheel 9. The steering shaft 1 rotates along with the steering wheel 9. The steering shaft 1 transmits the rotation of the steering wheel 9 to a rack (not shown) through the intermediate shaft etc.

A part of the inner shaft 12 that is connected to the outer shaft 11 by serration coupling can slide with the outer shaft 11. As will be described later, when the inner tube 3 moves relative to the outer tube 2 in the axial direction, the inner shaft 12 moves relative to the outer shaft 11 in the axial direction.

Outer Tube 2

Referring to FIG. 2, the outer tube 2 has a shape of a cylinder extending in the axial direction, and is disposed so as to be centered on the central axis L1. The outer tube 2 is disposed such that an end of the outer tube 2 on the one side in the axial direction is located farther on the one side in the axial direction than an end of the inner tube 3 on the one side in the axial direction.

The outer tube 2 houses a part of the steering shaft 1. Specifically, the outer tube 2 houses a part of the outer shaft 11 of the steering shaft 1 except for the end of the outer shaft 11 on the one side in the axial direction.

A bearing 25 is press-fitted at the end of the outer tube 2 on the one side in the axial direction. The bearing 25 holds the outer shaft 11 such that the outer shaft 11 rotates around the central axis L1 as the rotational axis.

Figure 3:
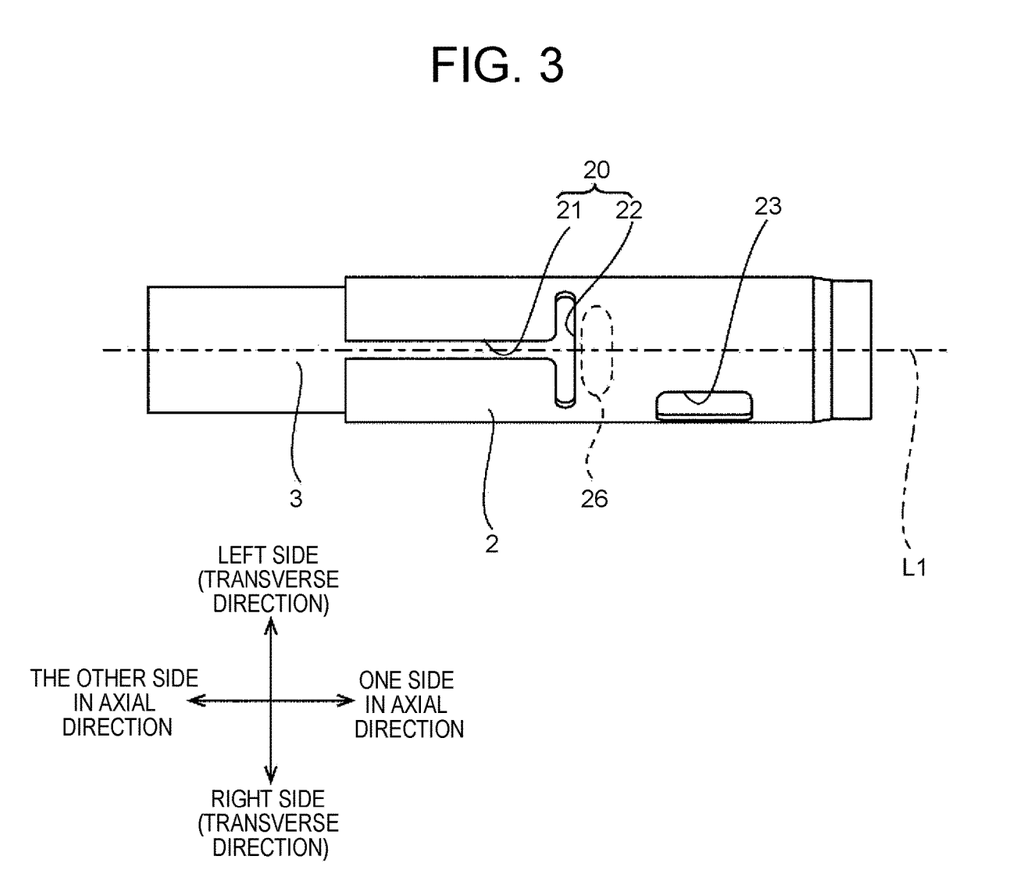
FIG. 3 is a plan view of an outer tube and an inner tube shown in FIG. 1.

FIG. 3 is a plan view of the outer tube 2 housing the end of the inner tube 3 on the one side in the axial direction. FIG. 3 corresponds to a view of the outer tube 2 and the inner tube 3 shown in FIG. 1, as seen from below.

Referring to FIG. 3, the outer tube 2 has a slit 20. The slit 20 is extending through the outer tube 2 in the vertical direction between an outer circumferential surface and an inner circumferential surface thereof. The slit 20 is substantially T-shaped when seen from below. The slit 20 is symmetrical with respect to a plane that includes the central axis L1 and is parallel to the vertical direction.

The slit 20 has slits 21, 22. Each of the slits 21, 22 is extending through the outer tube 2 in the vertical direction between the outer circumferential surface and the inner circumferential surface thereof.

The slit 21 is formed so as to extend in the axial direction. An end of the slit 21 on the other side in the axial direction is open. An end of the slit 21 on the one side in the axial direction is located farther on the other side in the axial direction than a midpoint of the outer tube 2 in the axial direction. Moreover, the end of the slit 21 on the one side in the axial direction is connected to the slit 22.

The slit 22 is formed in the outer circumferential surface of the outer tube, in a region farther on the other side in the axial direction than the midpoint of the outer tube 2 in the axial direction. The slit 22 is formed so as to extend in the transverse direction (a circumferential direction of the outer tube 2). The slit 22 is perpendicular to the slit 21.

As will be described in detail later, a connection region 26 is a region of the outer tube 2 to which a tube connection part 71 of the reinforcing member 7 shown in FIG. 1 is connected. The connection region 26 is located farther on the one side in the axial direction than the slit 22 (the end of the slit 20 on the one side in the axial direction).

The outer tube 2 further has a key lock hole 23. The key lock hole 23 is a substantially rectangular hole extending through the outer tube 2 between the outer circumferential surface and the inner circumferential surface thereof. The key lock hole 23 is located between the slit 22 formed in the outer tube 2 and the end of the outer tube 2 on the one side in the axial direction. Moreover, the key lock hole 23 is located in the outer tube 2 farther on the one side in the axial direction than the connection region 26.

A lock key of a steering lock device (not shown) is inserted into the key lock hole 23. When a driver of the vehicle equipped with the steering device 100 pulls out an ignition key (not shown), the lock key is fitted into a lock groove 11A (see FIG. 2) that is formed in the outer shaft 11. This makes the steering shaft 1 unable to rotate relative to the outer tube 2. Thus, when the ignition key has been pulled out, rotation of the steering wheel 9 is restricted, which can prevent theft of the vehicle equipped with the steering device 100.

Inner Tube 3

Referring to FIG. 2, the inner tube 3 has a shape of a cylinder extending in the axial direction, and is disposed so as to be centered on the central axis L1. The inner tube 3 houses a part of the steering shaft 1. Specifically, the inner tube 3 houses a part of the inner shaft 12 of the steering shaft 1 except for the end of the inner shaft 12 on the other side in the axial direction.

The end of the inner tube 3 on the one side in the axial direction is fitted into the outer tube 2 from the other side of the outer tube 2 in the axial direction. As the outer tube 2 fastens the inner tube 3 as will be described later, the inner tube 3 is fixed to the outer tube 2.

Clamp Brackets 4A, 4B

Referring to FIG. 1, the clamp brackets 4A, 4B extend downward from the outer circumferential surface of the outer tube 2. The clamp brackets 4A, 4B are disposed so as to face each other with the slit 21 therebetween. Thus, when the steering device 100 is seen from the axial direction, the clamp brackets 4A, 4B are disposed so as to face each other with the central axis L1 therebetween.

Figure 4:
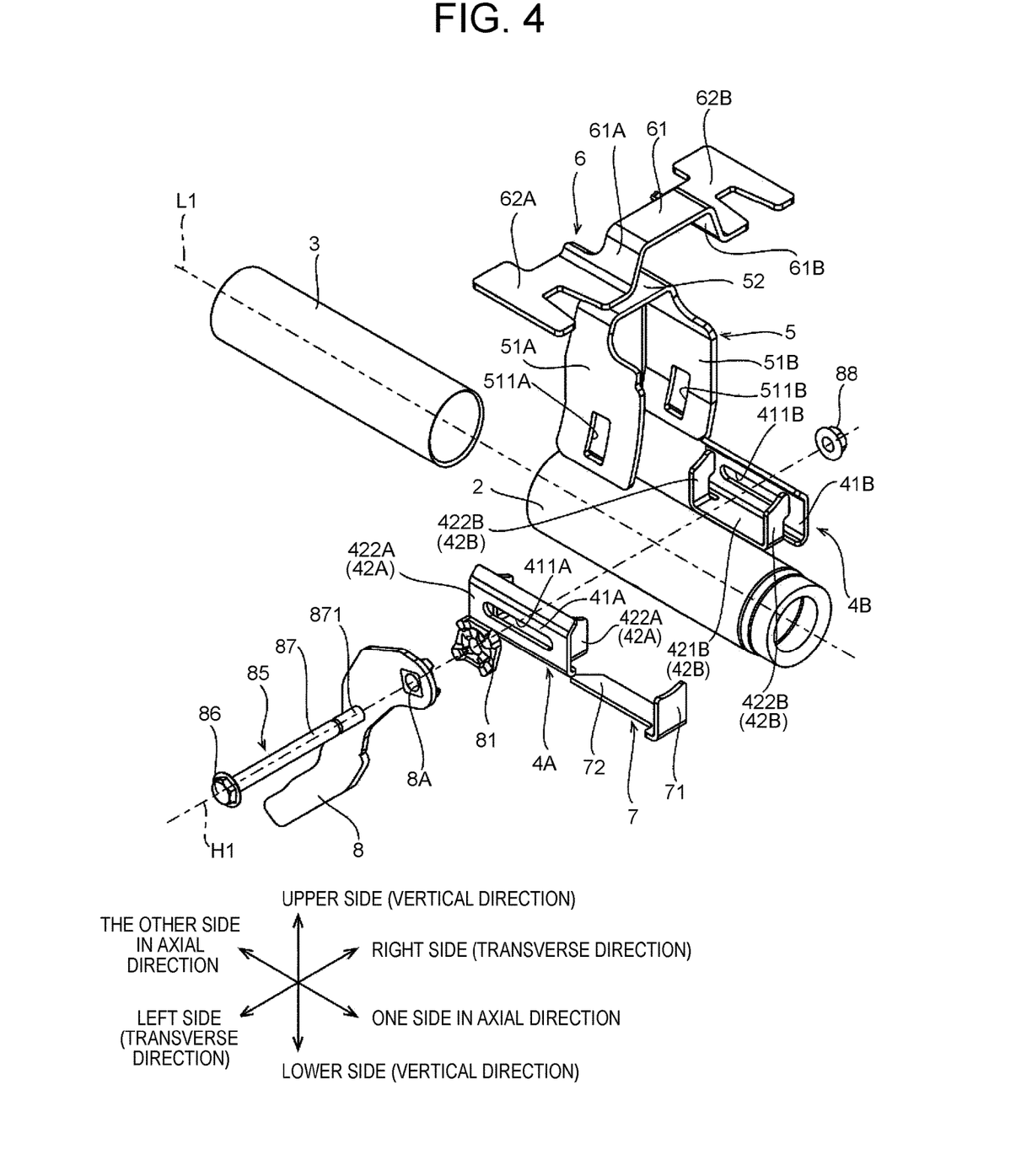
FIG. 4 is an exploded perspective view of the steering device shown in FIG. 1.

FIG. 4 is an exploded perspective view of the steering device 100. In FIG. 4, the central axis L1 is disposed so as to coincide with a centerline of each of the outer tube 2 and the inner tube 3. In FIG. 4, a transverse axis H1 is disposed so as to coincide with a centerline of a bolt 85.

Referring to FIG. 4, the clamp bracket 4B has a side wall 41B and a mounting part 42B.

The side wall 41B has a shape of a substantially flat plate disposed perpendicular to the transverse direction, and is elongated in the axial direction. The side wall 41B has a through-hole 411B formed therein. The through-hole 411B is extending through the side wall 41B in the transverse direction. Specifically, the through-hole 411B is an elongated hole extending in the axial direction and extending through the side wall 41B between a left-side surface and a right-side surface thereof.

The mounting part 42B is substantially U-shaped when the clamp bracket 4B is seen from the left side. The mounting part 42B has a connection portion 421B and fixing portions 422B.

The connection portion 421B has a shape of a flat plate perpendicular to the vertical direction, and is disposed so as to protrude from the left-side surface of the side wall 41B toward the left side. The fixing portions 422B extend upward respectively from both ends of the connection portion 421B in the axial direction. The fixing portions 422B each have a shape of a flat plate perpendicular to the axial direction. Upper ends of the fixing portions 422B each have an arc shape corresponding to the shape of the outer circumferential surface of the outer tube 2. As the upper ends of the fixing portions 422B are fixed by welding to the outer circumferential surface of the outer tube 2, the clamp bracket 4B is fixed to the outer circumferential surface of the outer tube 2.

The clamp bracket 4A is similar in shape to the clamp bracket 4B. Specifically, the clamp bracket 4A has a side wall 41A and a mounting part 42A.

The side wall 41A has a shape of a substantially flat plate disposed perpendicular to the transverse direction, and is elongated in the axial direction. The side wall 41A has a through-hole 411A formed therein. The through-hole 411A is extending through the side wall 41A in the transverse direction. Specifically, the through-hole 411A is an elongated hole extending in the axial direction and extending through the side wall 41A between a left-side surface and a right-side surface thereof.

The mounting part 42A is substantially U-shaped when the clamp bracket 4A is seen from the right side. The mounting part 42A has a connection portion 421A and fixing portions 422A.

The connection portion 421A has a shape of a flat plate perpendicular to the vertical direction, and is disposed so as to protrude from the right-side surface of the side wall 41A toward the right side. The fixing portions 422A extend upward respectively from both ends of the connection portion 421A in the axial direction. The fixing portions 422A each have a shape of a flat plate perpendicular to the axial direction. Upper ends of the fixing portions 422A each have an arc shape corresponding to the shape of the outer circumferential surface of the outer tube 2. As the upper ends of the fixing portions 422A are fixed by welding to the outer circumferential surface of the outer tube 2, the clamp bracket 4A is fixed to the outer circumferential surface of the outer tube 2.

Reinforcing Member 7

Referring to FIG. 4, the reinforcing member 7 is a substantially L-shaped member as seen from the transverse direction. The reinforcing member 7 has the tube connection part 71 and a bracket connection part 72.

The tube connection part 71 has a shape of a flat plate perpendicular to the axial direction and extending in the vertical direction. The length of the tube connection part 71 in the transverse direction is smaller than the length of the slit 22 in the transverse direction. A lower end of the tube connection part 71 is connected to an end of the bracket connection part 72 on the one side in the axial direction.

An upper end of the tube connection part 71 has an arc shape corresponding to the shape of the outer circumferential surface of the outer tube 2. The upper end of the tube connection part 71 is connected to the outer circumferential surface of the outer tube 2, for example, by welding. In this case, as shown in FIG. 3, the upper end of the tube connection part 71 is connected to the connection region 26 in the outer circumferential surface of the outer tube 2. In other words, the upper end of the tube connection part 71 is connected to a region of the outer circumferential surface of the outer tube 2 located farther on the one side in the axial direction than the end of the slit 20 on the one side in the axial direction.

The bracket connection part 72 has a shape of a flat plate perpendicular to the vertical direction and extending in the axial direction. The end of the bracket connection part 72 on the one side in the axial direction is connected to the lower end of the tube connection part 71. An end of the bracket connection part 72 on the other side in the axial direction is connected to the clamp bracket 4B, for example, by welding.

Tilt Bracket 5

Referring to FIG. 4, the tilt bracket 5 is substantially U-shaped when seen from the axial direction. With the clamp brackets 4A, 4B mounted on the outer circumferential surface of the outer tube 2, the tilt bracket 5 is disposed so as to cover the outer tube 2 and the clamp brackets 4A, 4B from above. The tilt bracket 5 has the arms 51A, 51B and a connection plate 52.

The arms 51A, 51B are members each having a shape of a flat plate extending in the vertical direction, and are disposed so as to be substantially perpendicular to the transverse direction. The arms 51A, 51B are disposed so as to hold the clamp brackets 4A, 4B therebetween from the transverse direction. Specifically, the arm 51A is located farther on the left side than the clamp bracket 4A, and the arm 51B is located farther on the right side than the clamp bracket 4B. Thus, the arms 51A, 51B are disposed so as to hold the clamp brackets 4A, 4B therebetween in the transverse direction. In other words, the arms 51A, 51B face each other in the transverse direction with the central axis L1 therebetween.

Referring to FIG. 1, in an installed state of the tilt bracket 5, upper ends of the arms 51A, 51B are located farther on the upper side than the outer tube 2. Lower ends of the arms 51A, 51B are located farther on the lower side than the clamp brackets 4A, 4B.

Referring to FIG. 4, the arm 51A has a through-hole 511A. The through-hole 511A is extending through the arm 51A in the transverse direction. Thus, the through-hole 511A is extending through the arm 51A between a right-side surface and a left-side surface thereof. The through-hole 511A is a hole elongated in the vertical direction.

The arm 51B has a through-hole 511B. The through-hole 511B is extending through the arm 51B in the transverse direction. Thus, the through-hole 511B is extending through the arm 51B between a right-side surface and a left-side surface thereof. The through-hole 511B is a hole elongated in the vertical direction.

The connection plate 52 has a shape of a flat plate perpendicular to the vertical direction, and is disposed farther on the upper side than the outer tube 2. The connection plate 52 connects the arm 51A and the arm 51B to each other.

Upper Bracket 6

Referring to FIG. 4, the upper bracket 6 has a base part 61 and mounting parts 62A, 62B.

The base part 61 is substantially U-shaped (inverted U-shaped) as seen from the axial direction, and is disposed farther on the upper side than the outer tube 2. A left-side end 61A of the base part 61 is connected to the mounting part 62A. A right-side end 61B of the base part 61 is connected to the mounting part 62B. As the left-side end 61A of the base part 61 is welded to the arm 51A of the tilt bracket 5 and the right-side end 61B of the base part 61 is welded to the arm 51B of the tilt bracket 5, the tilt bracket 5 is fixed to the upper bracket 6.

The mounting parts 62A, 62B each have a shape of a flat plate perpendicular to the vertical direction, and are fixed with bolts etc. (not shown) to the frame of the vehicle equipped with the steering device 100.

Lever 8

The lever 8 is used to adjust the position of the steering wheel 9 connected to the steering shaft 1.

Referring to FIG. 1, the lever 8 is disposed on the left side of the tilt bracket 5. The lever 8 is installed so as to be rotatable around the transverse axis H1 that is perpendicular to the central axis L1 and extends in the transverse direction.

Installation of the lever 8 will be described below. As shown in FIG. 1, the tilt bracket 5 is disposed so as to cover, from above, the outer tube 2 having the clamp brackets 4A, 4B fixed thereto. At this point, the clamp brackets 4A, 4B and the tilt bracket 5 are positioned. Specifically, referring to FIG. 4, the clamp brackets 4A, 4B and the tilt bracket 5 are positioned such that the transverse axis H1 passes through the through-hole 411A of the clamp bracket 4A, the through-hole 411B of the clamp bracket 4B, and the through-holes 511A, 511B of the tilt bracket 5. Thus, when seen from the transverse direction, the through-hole 411A of the clamp bracket 4A, the through-hole 411B of the clamp bracket 4B, and the through-holes 511A, 511B of the tilt bracket 5 overlap each other.

After the positioning, a shank 87 of the bolt 85 is placed so as to coincide with the transverse axis H1. Then, the bolt 85 is inserted from the left side through a through-hole 8A of the lever, the through-hole 411A of the clamp bracket 4A, the through-hole 411B of the clamp bracket 4B, and the through-holes 511A, 511B of the tilt bracket 5. A leading end 871 of the shank 87 of the bolt 85 protrudes from the clamp bracket 4B toward the right side. A nut 88 is fitted on the leading end 871 of the shank 87 protruding from the clamp bracket 4B toward the right side. As a result, the lever 8 is installed so as to be rotatable around the transverse axis H1.

Fixation of Inner Tube 3

When the lever 8 is in a lock position, the inner tube 3 is fixed to the outer tube 2. In this state, the inner tube 3 cannot move relative to the outer tube 2, so that movement of the steering wheel 9 in the axial direction is restricted.

When the lever 8 is in the lock position, movement of the steering wheel 9 in the vertical direction is also restricted. This restriction of movement in the vertical direction will be described later.

In the following, fixation of the inner tube 3 will be described. Referring to FIG. 4, a head 86 of the bolt 85 and the nut 88 fitted on the leading end 871 of the shank 87 of the bolt 85 hold the clamp brackets 4A, 4B and the tilt bracket 5 therebetween in the transverse direction. When the driver moves the lever 8 to the lock position, a cam 81 disposed between the lever 8 and the arm 51A of the tilt bracket 5 moves farther toward the right side than when the lever is in an unlock position. When the cam 81 moves toward the right side, a force with which the head 86 of the bolt 85 and the nut 88 hold the tilt bracket 5 therebetween in the transverse direction becomes larger than that when the lever 8 is in the unlock position.

As a result, the clearance between the arm 51A and the arm 51B of the tilt bracket 5 becomes smaller. The clamp bracket 4A is in contact with the arm 51A of the tilt bracket 5 and the clamp bracket 4B is in contact with the arm 51B of the tilt bracket 5. As the clearance between the arm 51A and the arm 51B becomes smaller, the clearance between the clamp bracket 4A and the clamp bracket 4B in the transverse direction becomes smaller.

As the clearance between the clamp bracket 4A and the clamp bracket 4B becomes smaller, the outer tube 2 elastically deforms so as to reduce the clearance of the slit 21. Thus, the outer tube 2 deforms so as to reduce the inside diameter thereof, and thereby fastens and holds the inner tube 3 from the outer side. In this way, the inner tube 3 is fixed to the outer tube 2

Adjustment of Position of Steering Wheel 9 in Axial Direction

Referring to FIG. 1, when the driver operates the lever 8 so as to move the lever 8 to the unlock position, the cam 81 moves toward the left side as the lever 8 rotates. As the cam 81 moves toward the left side, the holding force of the head 86 of the bolt 85 and the nut 88 decreases. As a result, the clearance between the clamp bracket 4A and the clamp bracket 4B becomes larger, so that the inner tube 3 is released from the fastening of the outer tube 2. As the inner tube 3 is released from the fastening, the inner tube 3 becomes able to move relative to the outer tube 2 in the axial direction. The driver can adjust the position of the steering wheel 9 in the axial direction by moving the steering wheel 9 in the axial direction.

Adjustment of Position of Steering Wheel 9 in Vertical Direction

As described above, when the lever 8 is in the lock position, the clearance between the arm 51A and the arm 51B of the tilt bracket 5 is small. Thus, as the arm 51A of the tilt bracket 5 presses the side wall 41A of the clamp bracket 4A toward the left side, a frictional force acting between the arm 51A of the tilt bracket 5 and the side wall 41A of the clamp bracket 4A increases. As the arm 51B of the tilt bracket 5 presses the side wall 41B of the clamp bracket 4A toward the right side, a frictional force acting between the arm 51B of the tilt bracket 5 and the side wall 41B of the clamp bracket 4B increases.

As a result, the clamp brackets 4A, 4B become unable to move relative to the tilt bracket 5 in the vertical direction, so that the steering wheel 9 is restricted from moving in the vertical direction.

As described above, when the lever 8 is in the unlock position, the holding force of the head 86 of the bolt 85 and the nut 88 is small. Since the force with which the arms 51A, 51B of the tilt bracket 5 hold the clamp brackets 4A, 4B therebetween is small, the outer tube 2 having the clamp brackets 4A, 4B fixed thereto can move relative to the tilt bracket 5 in the vertical direction. The driver can adjust the position of the steering wheel 9 in the vertical direction by moving the steering wheel 9 in the vertical direction.

Reduction of Stress on Slits 21, 22

Referring to FIG. 1, the tube connection part 71 of the reinforcing member 7 is connected to the connection region 26 that is a region of the outer circumferential surface of the outer tube 2 located farther on the one side in the axial direction than the slit 22. The bracket connection part 72 of the reinforcing member 7 is connected to the clamp bracket 4B. Thus, when a torsional force is applied to the outer tube 2, a stress applied to the end of the slit 20 on the one side in the axial direction can be reduced.

First, a stress that would be applied to the slit 20 if the steering device 100 does not include the reinforcing member 7 will be described.

As described above, when the ignition key has been pulled out, rotation of the steering wheel 9 is restricted by the lock key inserted in the key lock hole 23. When the steering wheel 9 is forcibly rotated despite the restriction of rotation of the steering wheel 9, a torsional force is applied to the outer tube 2.

The torsional force applied to the outer tube 2 is transmitted to the slit 20 as a rotational torque. Since the slit 22 is closest to the key lock hole 23 in the slit 20, a stress due to the rotational torque concentrates at a peripheral edge of the slit 22 in the outer tube 2. When the stress applied to the peripheral edge of the slit 22 in the outer tube 2 exceeds the mechanical strength of the outer tube 2, damage, such as a crack, may occur in the outer tube 2.

By contrast, when the steering device 100 includes the reinforcing member 7, the tube connection part 71 of the reinforcing member 7 is connected to the outer tube 2 at the connection region 26 that is a region farther on the one side in the axial direction than the slit 22. Thus, the tube connection part 71 of the reinforcing member 7 is disposed on the outer circumferential surface of the outer tube 2, at a position closer to the key lock hole 23 than the slit 22 that is closest to the key lock hole 23 in the slit 20.

As a result, when a torsional force is applied to the outer tube 2, the stress due to the rotational torque is applied to a connection part between the outer circumferential surface of the outer tube 2 and the reinforcing member 7 before being applied to the slit 22. Since the bracket connection part 72 of the reinforcing member 7 is connected to the mounting part 42B of the clamp bracket 4B, the stress due to the rotational torque is transmitted to the clamp bracket 4B through the reinforcing member 7. As a result, the stress applied to the slit 22 is reduced, and the stress due to the rotational torque can be prevented from concentrating at the slit 22.

When the lever 8 is in the lock position, the arms 51A, 51B of the tilt bracket 5 hold the clamp brackets 4A, 4B therebetween. The tilt bracket 5 is fixed to the upper bracket 6, and the upper bracket 6 is fixed to the frame of the vehicle (not shown). Thus, the stress transmitted to the clamp bracket 4B through the reinforcing member 7 is transmitted to the frame of the vehicle through the tilt bracket 5 and the upper bracket 6. Since the likelihood that the stress transmitted to the clamp bracket 4A through the reinforcing member 7 is transmitted again to the outer tube 2 can be reduced, breakage of the outer tube 2 due to a torsional force can be further prevented.

Referring to FIG. 1, a stress due to a rotational torque is transmitted to the frame of the vehicle through two paths in the steering device 100. Specifically, a stress due to a rotational torque is transmitted to the frame of the vehicle, either through the reinforcing member 7 to the clamp bracket 4B, or from the outer circumferential surface of the outer tube 2 directly to the clamp brackets 4A, 4B. Since the likelihood that a stress due to a rotational torque remains in the outer tube 2 is reduced, breakage of the outer tube 2 due to a torsional force can be further prevented.

The tube connection part 71 of the reinforcing member 7 is connected to the connection region that is a region of the outer circumferential surface of the outer tube 2 and located farther on the one side in the axial direction than the end of the slit 20 on the one side in the axial direction. As long as the tube connection part 71 of the reinforcing member 7 is connected to this region in the outer circumferential surface of the outer tube 2, the shape of the slit 20 is not limited. A stress applied to the one side of the slit 20 in the axial direction can be reduced even in the case where the shape of the slit 20 is different from the shape shown in FIG. 2, for example, due to the length of the outer tube 2 in the axial direction being limited depending on the type of vehicle.

The outer tube 2 has the slit 22 formed therein in addition to the slit 21. The slit 22 formed in the outer tube 2 allows the outer tube 2 to easily elastically deform so as to reduce the inside diameter. Thus, the length of the slit 21 in the axial direction can be reduced, so that the length of the steering column in the axial direction can be reduced.

In the reinforcing member 7, the length of the tube connection part 71 in the transverse direction is smaller than the length of the slit 22 in the transverse direction. Thus, when the outer tube 2 is held between the arms 51A, 51B of the tilt bracket 5 in the transverse direction, the outer tube 2 easily elastically deforms so as to reduce the inside diameter, and a force with which the outer tube 2 fastens the inner tube 3 increases. During normal driving of the vehicle, the inner tube 3 can be prevented from moving relative to the outer tube 2.

Modified Examples

In the above embodiment, the example where the key lock hole 23 is formed in the outer tube 2 has been described, but the present invention is not limited to this example. It is not essential that the key lock hole 23 is formed in the outer tube 2. Even without the key lock hole 23 formed in the outer tube 2, it is possible to reduce a stress that is applied to the peripheral edge of the slit 22 when, for some reason, a torsional force is applied to a part of the outer tube 2 farther on the one side in the axial direction than the slit 22.

In the above embodiment, the example where the slit 22 is formed in the outer tube 2 has been described, but the present invention is not limited to this example. It is not essential that the slit 22 is formed in the outer tube 2. It is possible to reduce a stress applied to the peripheral edge of the end of the slit 21 on the one side in the axial direction when a torsional force is applied to the outer tube 2 that has no slit 22 formed therein.

In the above embodiment, the example has been described where a stress is transmitted to the frame of the vehicle through the reinforcing member 7, the clamp brackets 4A, 4B, the tilt bracket 5, and the upper bracket 6 when the arms 51A, 51B of the tilt bracket 5 hold the clamp brackets 4A, 4B therebetween. However, the present invention is not limited to this example. It is not essential that the arms 51A, 51B of the tilt bracket 5 hold the clamp brackets 4A, 4B therebetween. When the arms 51A, 51B of the tilt bracket 5 do not hold the clamp brackets 4A, 4B therebetween, a stress may not be transmitted from the latter to the former. Nevertheless, the stress applied to the peripheral edge of the slit 22 can be reduced as the stress is transmitted to the clamp brackets 4A, 4B through the reinforcing member 7.

In the above embodiment, the example where the bracket connection part 72 of the reinforcing member 7 is connected to the clamp bracket 4B has been described, but the present invention is not limited to this example. Alternatively, the bracket connection part 72 of the reinforcing member 7 may be connected to the clamp bracket 4A. When the bracket connection part 72 of the reinforcing member is connected to both of the clamp brackets 4A, 4B, it becomes difficult to reduce the clearance between the clamp brackets 4A, 4B. For this reason, it is desirable that the bracket connection part 72 of the reinforcing member be connected to one of the clamp brackets 4A, 4B.

In the above embodiment, the example where the reinforcing member 7 is a substantially L-shaped member as seen from the transverse direction has been described, but the present invention is not limited to this example. The shape of the reinforcing member 7 is not particularly limited, provided that the tube connection part 71 of the reinforcing member 7 is connected to the connection region 26 of the outer circumferential surface of the outer tube 2 located farther on the one side in the axial direction than the end of the slit 20 on the one side in the axial direction, and that the bracket connection part 72 of the reinforcing member 7 is connected to one of the clamp brackets 4A, 4B.

In the above embodiment, the example where the slit 22 extends in the transverse direction has been described, but the present invention is not limited to this example. The slit 22 may extend in any direction that intersects the axial direction. Then, the outer tube 2 can easily elastically deform so as to reduce the inside diameter, so that the length of the steering column in the axial direction can be reduced.

In the above embodiment, the example where the length of the tube connection part 71 in the transverse direction is smaller than the length of the slit 22 in the transverse direction has been described, but the present invention is not limited to this example. The length of the tube connection part 71 in the extension direction of the slit 22 may be larger than the length of the slit 22 in the extension direction of the slit 22. Even in this case, a stress applied to the peripheral edge of the slit 22 can be reduced.

While an embodiment of the present invention has been described above, this embodiment is merely an example of implementation of the present invention. Thus, the present invention is not limited to the above embodiment but can be implemented with modifications appropriately made to the above embodiment within the scope of the gist of the invention.

What is claimed is:

1. A steering device comprising:
   an inner tube extending in an axial direction;
   an outer tube that fixes the inner tube by fastening an end of the inner tube on one side in the axial direction from an outer side, and that has a first slit extending through the outer tube between an inner circumferential surface and an outer circumferential surface thereof and extending in the axial direction;
   a pair of clamp brackets that is disposed so that the clamp brackets face each other with the first slit therebetween, and that extends from the outer circumferential surface of the outer tube in a direction intersecting the axial direction; and a reinforcing member including:
- a bracket connecting part that is connected to one of the clamp brackets and is spaced from the outer tube in a radial direction; and
- a tube connection part that extends in the radial direction from a first end connected to a connection region of the outer tube to a second end connected to the bracket connecting part, the connection region of the outer tube being a region of the outer circumferential surface of the outer tube located farther on the one side in the axial direction than an end of the first slit on the one side in the axial direction.

2. The steering device according to claim 1, further comprising:
- a tilt bracket that holds the clamp brackets in a direction in which the clamp brackets face each other; and
- an upper bracket that is fixed to the tilt bracket and also configured to be fixed to a frame of a vehicle equipped with the steering device.

3. The steering device according to claim 1, wherein the outer tube has a second slit extending through the outer tube between the inner circumferential surface and the outer circumferential surface thereof, the second slit extending in a direction intersecting an extension direction of the first slit and being connected to the end of the first slit on the one side in the axial direction.

4. The steering device according to claim 3, wherein a length of the tube connection part in an extension direction of the second slit is smaller than a length of the second slit in the extension direction of the second slit.

5. The steering device according to claim 1, wherein the outer tube has a key lock hole which is located farther on the one side in the axial direction than the connection region of the outer tube and extends through the outer tube between the inner circumferential surface and the outer circumferential surface thereof, the key lock hole being configured such that a lock key of a steering lock device of a vehicle equipped with the steering device can be inserted.

6. A steering device comprising:
- an inner tube extending in an axial direction;
- an outer tube that fixes the inner tube by fastening an end of the inner tube on one side in the axial direction from an outer side, the outer tube comprising:
  - a first slit extending through the outer tube between an inner circumferential surface and an outer circumferential surface thereof and extending in the axial direction; and
  - a second slit extending through the outer tube between the inner circumferential surface and the outer circumferential surface thereof, the second slit extending in a direction intersecting an extension direction of the first slit and being connected to the end of the first slit on the one side in the axial direction;
- a pair of clamp brackets that is disposed so that the clamp brackets face each other with the first slit therebetween, and that extends from the outer circumferential surface of the outer tube in a direction intersecting the axial direction; and
- a reinforcing member that is connected to one of the clamp brackets and includes a tube connection part connected to a connection region that is a region of the outer circumferential surface of the outer tube and located farther on the one side in the axial direction than an end of the first slit on the one side in the axial direction, a length of the tube connection part in an extension direction of the second slit being smaller than a length of the second slit in the extension direction of the second slit.

* * * * *